Figure 2:
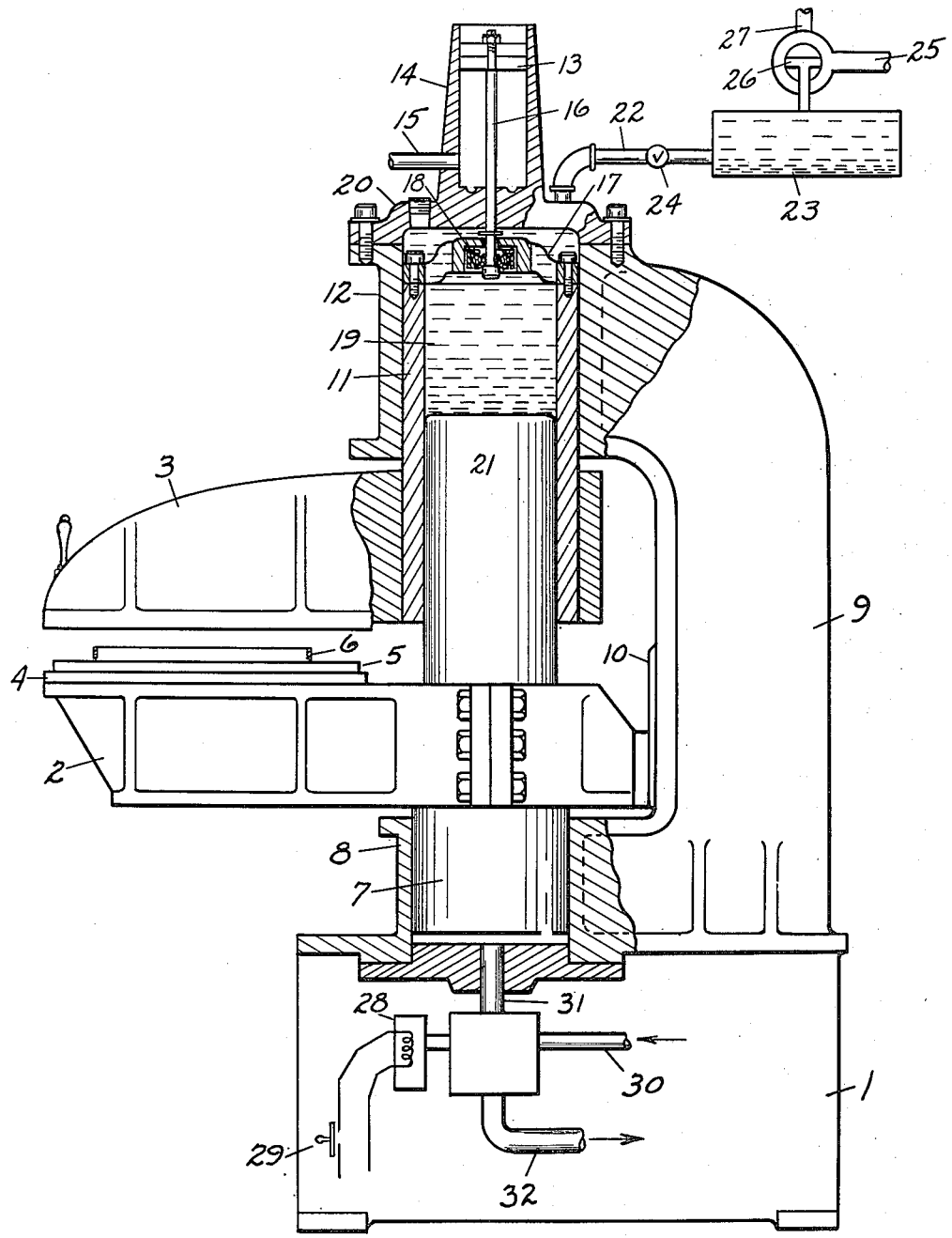

Aug. 28, 1956  M. C. SUERKEN  2,760,569
CLICKING MACHINE
Filed Aug. 19, 1953  2 Sheets-Sheet 1
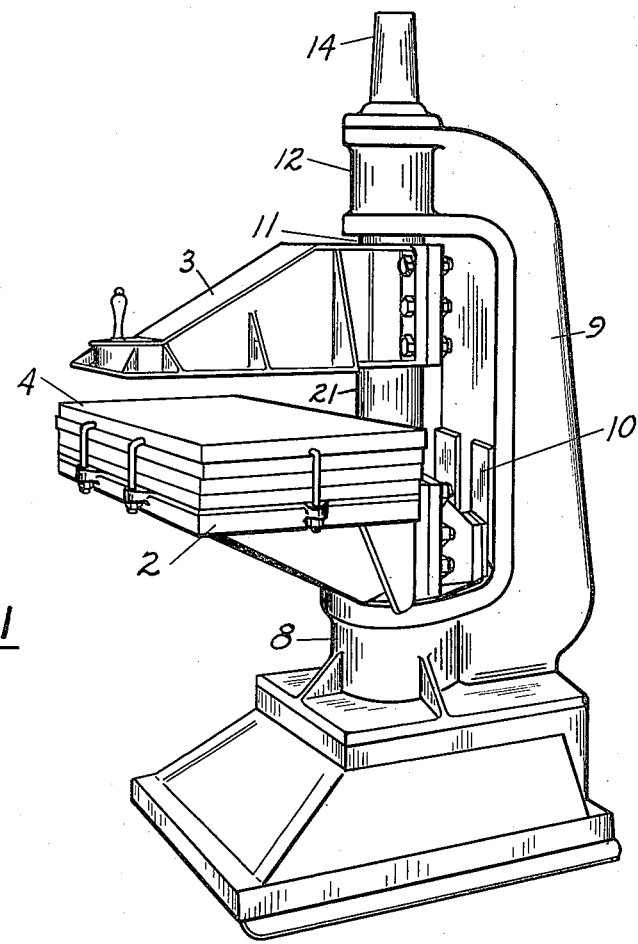
FIG. 1
FIG. 3
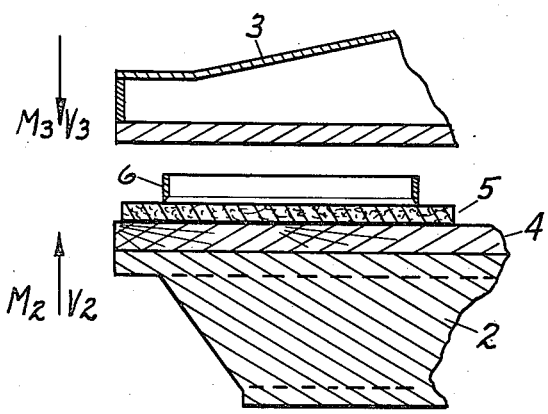
INVENTOR.
Maxwell C. Suerken
BY Ralph Hammar
Attorney

2,760,569
CLICKING MACHINE

Maxwell C. Suerken, Erie, Pa., assignor to Lamac Process Company, Erie, Pa., a corporation of Delaware Application August 19, 1953, Serial No. 375,225

5 Claims. (Cl. 164—25)

This invention is a clicking machine such as used in the shoe industry, which is intended to eliminate or reduce the impact shock transmitted to the building structure. Instead of the conventional clicking machine where the upper platen or arm strikes the stationary platen or cutting block on which the die and work are arranged, in the present machine, the upper and lower platens move toward each other with substantially equal and opposite momentums so the shock is substantially cancelled. Features include a hydraulic interlock positively relating the movement of the platens and an adjustment for the daylight opening between the platens.

In the accompanying drawing, Fig. 1 is a perspective of a clicking machine; Fig. 2 is a sectional elevation; and Fig. 3 is a diagram illustrating the operation.

The conventional parts of the clicking machine are readily identified, 1 being the base, 2 the lower platen or cutting block, and 3 the upper platen. The lower platen is made with a replaceable surface 4 of wood, fiber or plastic on which the work 5 and cutting die 6 are arranged. In cutting leather, the die 6 is of sheet metal in edgewise relation as in a cooky-cutter and is arranged on the leather so as to avoid blemishes. Because of the small clearance or daylight opening between the platens in the open position, the upper platen is pivoted so it can be swung to one side of the lower platen while the work and cutting die are being arranged on the lower platen and then brought back into register with the lower platen. The parts so far described are or may be of common construction.

The lower platen is fixed to the upper end of a piston 7 in a cylinder 8 integral with an upright 9 on the base 1. The vertical travel of the lower platen is guided by guideways 10 on the upright. The upper platen 3 is fixed to the lower end of a sleeve 11 slidably and rotatably carried in a cylinder 12 integral with the upper end of the upright 9. The sleeve 11 is continuously biased to the uppermost position by a piston 13 in an air cylinder 14 on top of the cylinder 12. The upper end of the cylinder 14 is open to the atmosphere and the lower end of the cylinder is directly connected to a compressed air line 15. The piston 13 is fixed to a piston rod 16, which extends through the bottom of the cylinder 14 into the cylinder 12 and is connected to the upper end of the sleeve 11 by a spider 17. A combined ball and thrust bearing 18 arranged between the piston rod 16 and the spider takes the axial thrust and at the same time permits rotation of the sleeve 11 relative to the rod 16 as an incident to the pivoting of the upper platen 3 to one side of the lower platen 2 to permit the work to be arranged thereon. The piston 13 is a counterbalance piston which exerts a constant pressure in the direction to urge the upper platen 3 to its uppermost position.

The cylinder 12 is a closed hydraulic cylinder filled with oil 19. The upper end of the cylinder 12 is closed by a head 20 integral with the bottom of the counterbalance cylinder 14. The lower end of the cylinder 12 is closed by the sleeve 11 fixed to the upper platen and by a rod 21 telescoped within the sleeve 11 and fixed to the lower platen. In the lowermost position of the lower platen 2, the upward pressure exerted by the counterbalance piston 13 will move the sleeve 11 upward until the volume within the cylinder 12 between the sleeve 11 and the rod 21 and the head 20 exactly equals the volume of oil within the cylinder. Since the oil is essentially incompressible, this determines the uppermost position of the platen 3 and accordingly determines the daylight opening between the upper and lower platens. The uppermost position of the upper platen 3 can be adjusted by adding or removing oil from the cylinder 12. A convenient way of adding or removing oil from the cylinder 12 is through a line 22 leading to an oil reservoir 23 and controlled by a shut-off valve 24. When the oil is to be added or removed, the shut-off valve 24 is open, but at all other times the shut-off valve is closed. Adding oil to the cylinder 12, which decreases the daylight opening between the upper and lower platens, is effected by connecting the upper surface of the oil in the reservoir 23 to a compressed air line 25 through a three-way valve 26. Under this condition, the oil is forced from the reservoir 23 into the cylinder 12 and overcomes the counterbalance force exerted by the counterbalance piston 13. This forces the sleeve 11 downward thereby decreasing the daylight opening between the upper and lower platens. When oil is to be removed from the cylinder 12 so as to increase the daylight opening between the upper and lower platens, the three-way valve 26 is rotated 90° in a clockwise direction so as to connect the upper surface of the reservoir 23 to atmospheric pressure through a vent line 27. Under this condition, the force exerted by the counterbalance piston 13 moves the sleeve 11 upward and forces oil out of the cylinder 12 back into the reservoir 23 through the line 22.

The closed hydraulic cylinder 12 serves as an interlock relating the movements of the upper and lower platens. When air is admitted to the cylinder 8, thereby forcing the piston 7 connected to the lower platen upward, the rod 21 connected to the lower platen likewise moves upward in the closed hydraulic cylinder 12 and forces the sleeve 11 downward thereby moving the upper platen downward. By properly relating the area of the rod 21 to the area of the sleeve 11, the speed of travel of the upper and lower platens can be inversely related to the weights of the platens so that the platens will have equal and opposite momentums. This means that when the two platens meet, the impact shock is cancelled and is not transmitted to the base 1. It is not necessary that the upper and lower platens have precisely equal and opposite momentums, because it is not necessary to entirely cancel the impact shock. Furthermore, there is some damping in the air cylinder and in the oil in the closed hydraulic cylinder 12 which reduces the stress on the frame of the machine more than if a purely mechanical drive were used for both platens.

When the air pressure in the cylinder 8 is released, the counterbalance piston 13 moves the sleeve 11 upward and thereby forces the rod 21 downward. This returns the upper and lower platens to the separated position.

The machine is conveniently controlled by a solenoid valve 28 having a pushbutton 29 for energizing the valve. The pushbutton 29 may be located in any convenient location, but is usually on the upper platen 3. When the solenoid valve is energized, a compressed air line 30 is connected to a way 31 leading to the underside of the piston 7 in the cylinder 8. When the solenoid valve is de-energized, the way 31 is connected to a vent 32 and the compressed air line is shut off. The solenoid valve 28 is a three-way valve which may be of common construction.

In the use of the clicking machine, the material to be cut is arranged on the cutting surface 4 and the cutting die is suitably located on the work. If the material being cut is leather, the die is usually located so as to avoid blemishes. In the case of other materials for which clicking machines are used such as rubber or plastics, this may be unnecessary. The operator then closes the pushbutton 29 in circuit with the solenoid valve 28 connecting the compressed air line 30 to the cylinder 8 through the way 31. The compressed air acting on the underside of the piston 7 raises the lower platen 2 and the rod 21 moving upward within the sleeve 11 in the closed hydraulic cylinder 12 causes the upper platen 3, which is merely a flat plate, to move downward toward the lower platen. When the two platens meet, they are moving in opposite directions and the impact shock tends to cancel. If the momentum of the upper platen ($M_3V_3$ as shown in Fig. 3) is exactly equal to the momentum of the lower platen ($M_2V_2$) the impact shock will be completely cancelled. In any event, since there is no direct mechanical connection between the platens and the frame, the impact shocks are damped out and are less than as though there were a purely mechanical drive from the frame to the platens. The cutting action of the die 6 is primarily by impact driving the die through the material to the cutting surface 4. The platens are opened to remove the work by releasing the pushbutton 29 de-energizing the solenoid valve 28. This shuts off the compressed air supply from line 30 and connects the way 31 leading to the cylinder 8 to a vent 32. The counterbalance piston 13 pulls the upper platen 3 upward by reason of the direct connection of the piston rod 16 to the sleeve 11 to which the upper platen is fixed. The upward movement of the sleeve 11 within the closed hydraulic cylinder 12 exerts a pressure on the oil 19, which acts on the upper end of the rod 21 connected to the lower platen 2 and moves the lower platen downward to its lowermost position.

What is claimed as new is:

1. In a clicking machine, a lower platen having a cutting surface on which the work is arranged, a die resting on the work, an upper platen normally spaced above the die, a base, an air cylinder on the base having its piston supporting one of the platens and moving it toward the other platen, a closed liquid filled cylinder on the base, a vertical sleeve slidable in the closed cylinder and supporting said other platen, and a vertical rod telescoped within the sleeve and connected to said one platen to move toward the other platen within the sleeve as said one platen is moved toward the other platen, the liquid displaced by the rod forcing the sleeve and said other platen carried thereby in a direction opposite to the said one platen whereby the platens move toward each other and force the die through the work.

2. The clicking machine of claim 1 in which the upper and lower platens have substantially equal and opposite momentums at the point of impact.

3. In a clicking machine, a lower platen having a cutting surface on which the work is arranged, a die resting on the work, an upper platen normally spaced above the die, a drive for moving one of the platens toward the other, and an interlock transmitting the driving force from said one platen to the other platen to move the other platen in a direction opposite to said one platen comprising a closed liquid filled system, a piston operatively connected to said one platen acting on the liquid in the system to displace the liquid, and another piston operatively connected to said other platen and acted upon by the displaced liquid.

4. In a clicking machine, a lower platen having a cutting surface on which the work is arranged, a die resting on the work, an upper platen normally spaced above the die, a base, an air cylinder on the base having its piston supporting the lower platen and moving the lower platen upward, a closed liquid filled cylinder on the base above the upper platen, a vertical sleeve slidable in the lower end of the closed cylinder and supporting the upper platen, a vertical rod telescoped within the lower end of the sleeve and connected to the lower platen to move upward within the sleeve as the lower platen is moved upward, the liquid displaced by the rod forcing the sleeve and the upper platen carried thereby downward whereby the platens move toward each other and force the die through the work, and a counterbalance cylinder having its piston connected to the sleeve and biasing the sleeve upward with force sufficient to lift the upper platen and to thereby force the lower platen downward in the absence of force from the air cylinder.

5. In a clicking machine, a base, a cylinder on the base, a piston in the cylinder, a lower platen having a surface on which the work is arranged, a die resting on the work, an upper platen normally spaced above the die, an operative connection between one of the platens and the first piston for moving said one platen toward the other platen, a liquid filled cylinder, a second piston in the liquid filled cylinder operatively connected to the other platen, a third piston in the liquid filled cylinder operatively connected to said one platen, said third piston acting through the liquid to force the other platen in a direction opposite to said one platen whereby the platens are moving toward each other at the point of impact.

References Cited in the file of this patent

UNITED STATES PATENTS

| 13,796 | Molliere | Nov. 13, 1855 |
| 326,183 | Werts | Sept. 15, 1885 |

FOREIGN PATENTS

| 445,920 | France | Sept. 17, 1912 |
| 900,388 | France | Oct. 2, 1944 |